United States Patent
Hsu et al.

(10) Patent No.: US 11,681,335 B1
(45) Date of Patent: Jun. 20, 2023

(54) HINGE FOR A FLEXIBLE ELECTRONIC DEVICE

(71) Applicant: FOSITEK CORPORATION, New Taipei (TW)

(72) Inventors: An-Szu Hsu, New Taipei (TW); An-Wei Chung, Kaohsiung (TW)

(73) Assignee: FOSITEK CORPORATION, New Taipei (TW)

( * ) Notice: Subject to any disclaimer, the term of this patent is extended or adjusted under 35 U.S.C. 154(b) by 0 days.

(21) Appl. No.: 17/703,220

(22) Filed: Mar. 24, 2022

(30) Foreign Application Priority Data

Feb. 21, 2022 (TW) ................................. 111106169

(51) Int. Cl.
*G06F 1/16* (2006.01)
(52) U.S. Cl.
CPC .......... *G06F 1/1681* (2013.01); *G06F 1/1652* (2013.01)
(58) Field of Classification Search
CPC .............................. G06F 1/1681; G06F 1/1652
See application file for complete search history.

(56) References Cited

U.S. PATENT DOCUMENTS

| | | | | |
|---|---|---|---|---|
| 10,550,880 B2* | 2/2020 | Hsu | ........................ | F16C 11/04 |
| 10,895,894 B2* | 1/2021 | Jan | ........................ | G06F 1/1652 |
| 11,003,209 B2* | 5/2021 | Seo | ........................ | G06F 1/1652 |
| 11,194,366 B2* | 12/2021 | Cheng | .................... | G06F 1/1652 |
| 11,294,431 B2* | 4/2022 | Torres | .................... | G06F 1/1681 |
| 11,516,932 B2* | 11/2022 | Sim | ........................ | H05K 5/0226 |
| 2022/0104370 A1* | 3/2022 | Wu | ........................ | H05K 5/0217 |
| 2023/0049603 A1* | 2/2023 | Zheng | ................. | H04M 1/0216 |
| 2023/0053947 A1* | 2/2023 | Liu | ........................ | G06F 1/1681 |

FOREIGN PATENT DOCUMENTS

CN          110784570          2/2020

OTHER PUBLICATIONS

Search Report issued in corresponding TW Application 111106169, dated Sep. 12, 2022, and an English Translation, 2 pages.

* cited by examiner

*Primary Examiner* — Rockshana D Chowdhury
(74) *Attorney, Agent, or Firm* — Burris Law, PLLC

(57) ABSTRACT

A hinge is connectable with two housing parts to allow opening and closing of the housing parts. The hinge includes a mounting seat and two rotary units. The mounting seat has a central recessed portion. The rotary units are connected with the mounting seat and shiftable between an unfolded state and a folded state. Each rotary units includes a linking member, a rail sliding block, a rotating bracket and a cover plate. During the shifting from the unfolded state to the folded state, the rail sliding block is slid relative to both the linking member and the rotating bracket and is turned relative to the mounting seat. In the folded state, the cover plates are inclined to each other in a direction away from the mounting seat to cooperate with the central recessed portion to form a space for receiving a bending portion of a flexible display.

7 Claims, 8 Drawing Sheets

HINGE FOR A FLEXIBLE ELECTRONIC DEVICE

CROSS-REFERENCE TO RELATED APPLICATION

This application claims priority of Taiwanese Patent Application No. 111106169, filed on Feb. 21, 2022.

FIELD

The disclosure relates to a hinge, and more particularly to a hinge for a flexible electronic device to support a flexible display of the electronic device.

BACKGROUND

Recently, with the technology development of flexible screens, i.e. flexible display screens, foldable electronic devices with flexible displays have also developed accordingly. A conventional flexible electronic device generally has a hinge mechanism connected between two housing parts to allow opening and closing of the housing parts and to support the flexible display. According to whether the flexible display is disposed inside or outside of the electronic device when the electronic device is folded, the flexible displays have an infolding structure or an outfolding structure. The flexible display of the infolding structure is bent to a U-shape when folded. Since the hinge used with the infolded flexible display has a large number of component parts, the assembly tolerance thereof is large due to the accumulation of forming tolerances of all the component parts, which affects the flatness and straightness of the whole device and increases the weight and costs of the device. Moreover, a conventional hinge generally has a support plate for supporting the bending portion of the flexible display when folded. Such support plate causes an insufficient space for receiving the flexible display.

SUMMARY

Therefore, an object of the disclosure is to provide a hinge for a flexible electronic device that can alleviate at least one of the drawbacks of the prior art.

According to the disclosure, the hinge is connectable with two housing parts of a flexible electronic device to allow opening and closing of the housing parts and for supporting a flexible display. The hinge includes a mounting seat and two rotary units. The mounting seat extends in a lengthwise direction and has two lengthwise edges at two opposite sides of a central line. The mounting seat has two first arcuate slots which are symmetric to each other and extend from the central line toward the lengthwise edges, respectively, and a central recessed portion which is formed at the central line. The rotary units are connected with the mounting seat and at the two opposite sides of the central line, respectively, and symmetric to each other. The two rotary units are shiftable between an unfolded state and a folded state. Each of the rotary units includes a linking member, a rail sliding block, a rotating bracket and a cover plate. The linking member has a linking body which has a cover supporting surface, a first arcuate rail which extends from the linking body and which is slidably engaged with a respective one of the first arcuate slots, and a second arcuate rail which extends from the linking body and away from the first arcuate rail. The rail sliding block has a block body which has a housing supporting surface for one of the housing parts to be attached thereto, and a lateral end surface that is connected with and transverse to the housing supporting surface, a second arcuate slot which is formed in the block body and slidably engaged with the second arcuate rail, and an inclined sliding portion which is formed in the lateral end surface and opposite to the second arcuate slot in the lengthwise direction. In the unfolded state of the rotary units, the block body is disposed adjacent to a respective one of the lengthwise edges of the mounting seat, and the housing supporting surface is disposed parallel to the cover supporting surface. The rotating bracket is pivotally connected with the mounting seat, and has a bracket body and an inclined guiding portion which extends from the bracket body and is slidably engaged with the inclined sliding portion. During the shifting of the rotary units from the unfolded state to the folded state, the rail sliding block is slid relative to both the second arcuate rail and the inclined guiding portion and is turned relative to the mounting seat. The cover plate is securely connected with and supported on the cover supporting surface to be moved with the linking member. In the unfolded state of the rotary units, the cover supporting surfaces of the linking members are flush with each other and in a horizontal state and the cover plates are disposed to cover the mounting seat. In the folded state of the rotary units, the cover supporting surfaces are inclined to each other in a direction away from the mounting seat to bring the cover plates into inclination to each other, and the housing supporting surfaces of the rail sliding blocks are disposed to face and parallel to each other and in a vertical state.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
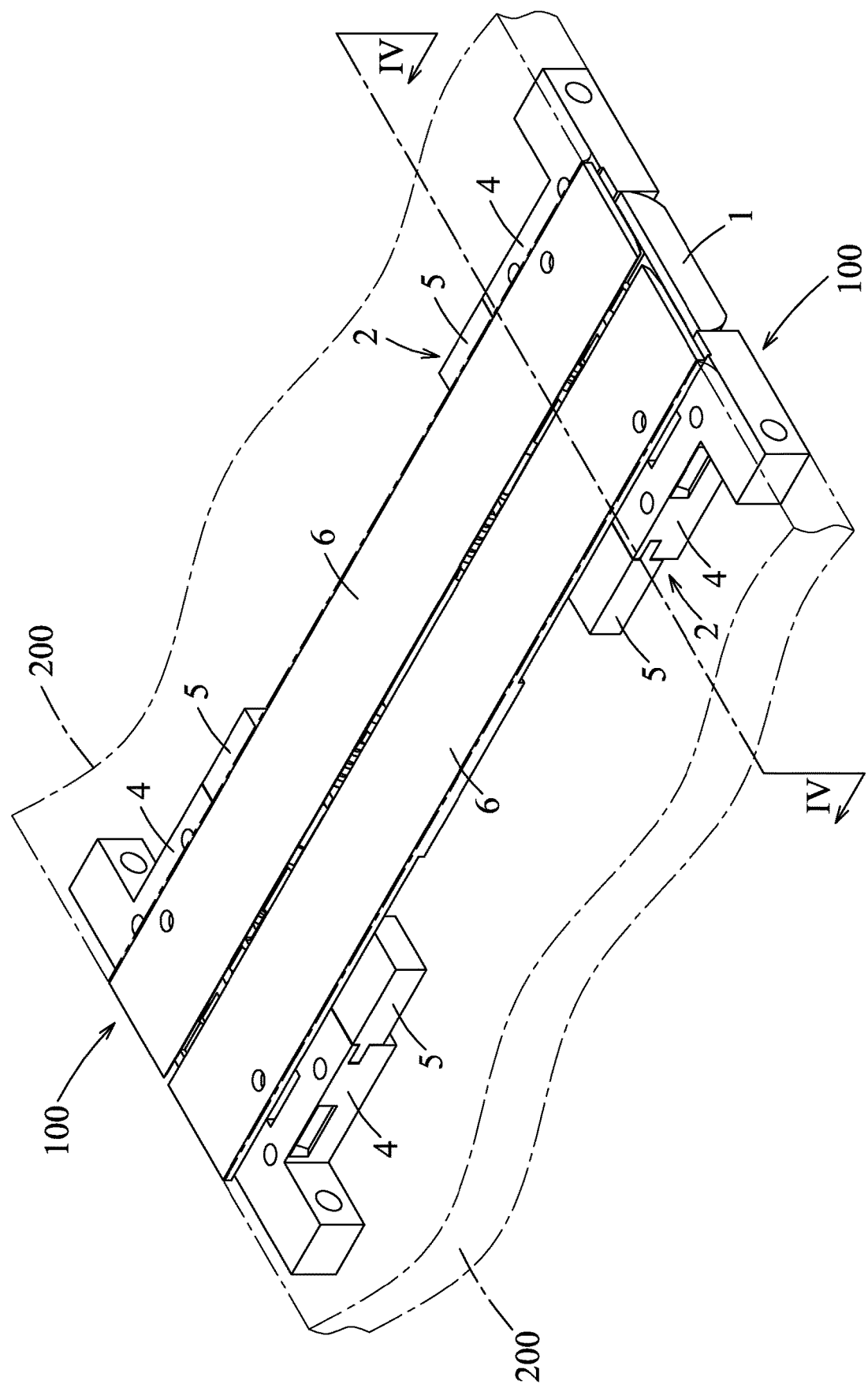
FIG. 1 is a perspective view illustrating an embodiment of a hinge according to the disclosure in an unfolded state.

Referring to FIGS. 1 to 4, an embodiment of a hinge 100 according to the disclosure is adapted to be connectable with two housing parts 200 of a flexible electronic device to allow opening and closing of the housing parts 200 and for supporting a flexible display 300. The hinge 100 includes a mounting seat 1, two rotary units 2 and a torque synchronous mechanism 7. In this embodiment, two of the hinges 100 are mounted cooperatively on the two housing parts 200.

The mounting seat 1 includes an elongated seat body 11 extending in a lengthwise direction, a rail bracket 12 securely mounted on the elongated seat body 11, and a fixed bracket 13 securely mounted on the elongated seat body 11.

The elongated seat body 11 has two lengthwise edges 111 at two opposite sides of a central line (C). The rail bracket 12 is formed with two first arcuate slots 121 therein. The first arcuate slots 121 are symmetric to each other and extend from the central line (C) toward the lengthwise edges 111, respectively. The elongated seat body 11 has a central recessed portion 14 formed at the central line (C), and two lateral recessed portions 15 formed at two opposite sides of the central recessed portion 14, respectively.

Figure 3:
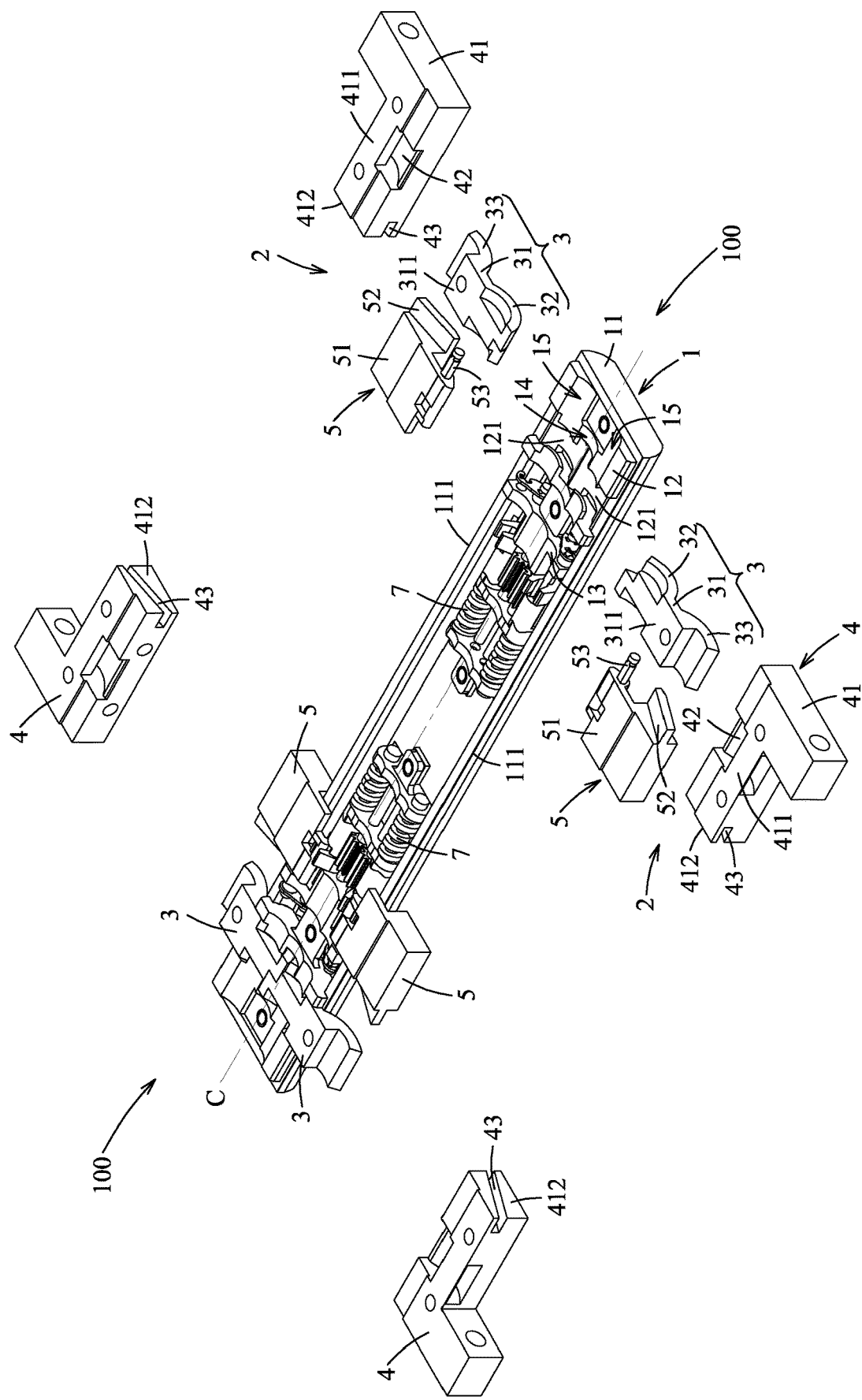
FIG. 3 is an exploded perspective view of the embodiment, two cover plates being removed for the sake of clarity.
Figure 5:
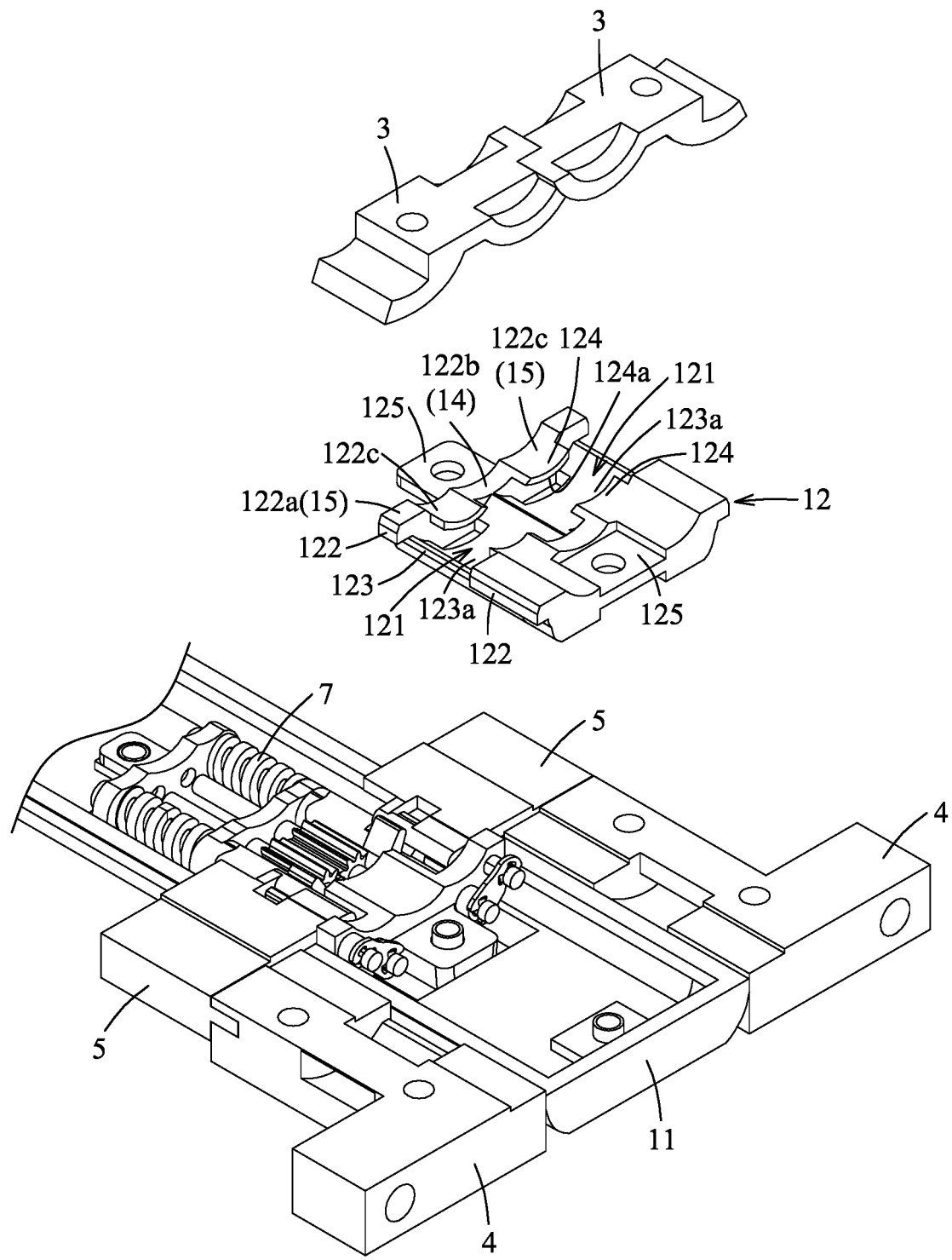
FIG. 5 is a fragmentary exploded perspective view of the embodiment, the two cover plates being removed.
Figure 6:
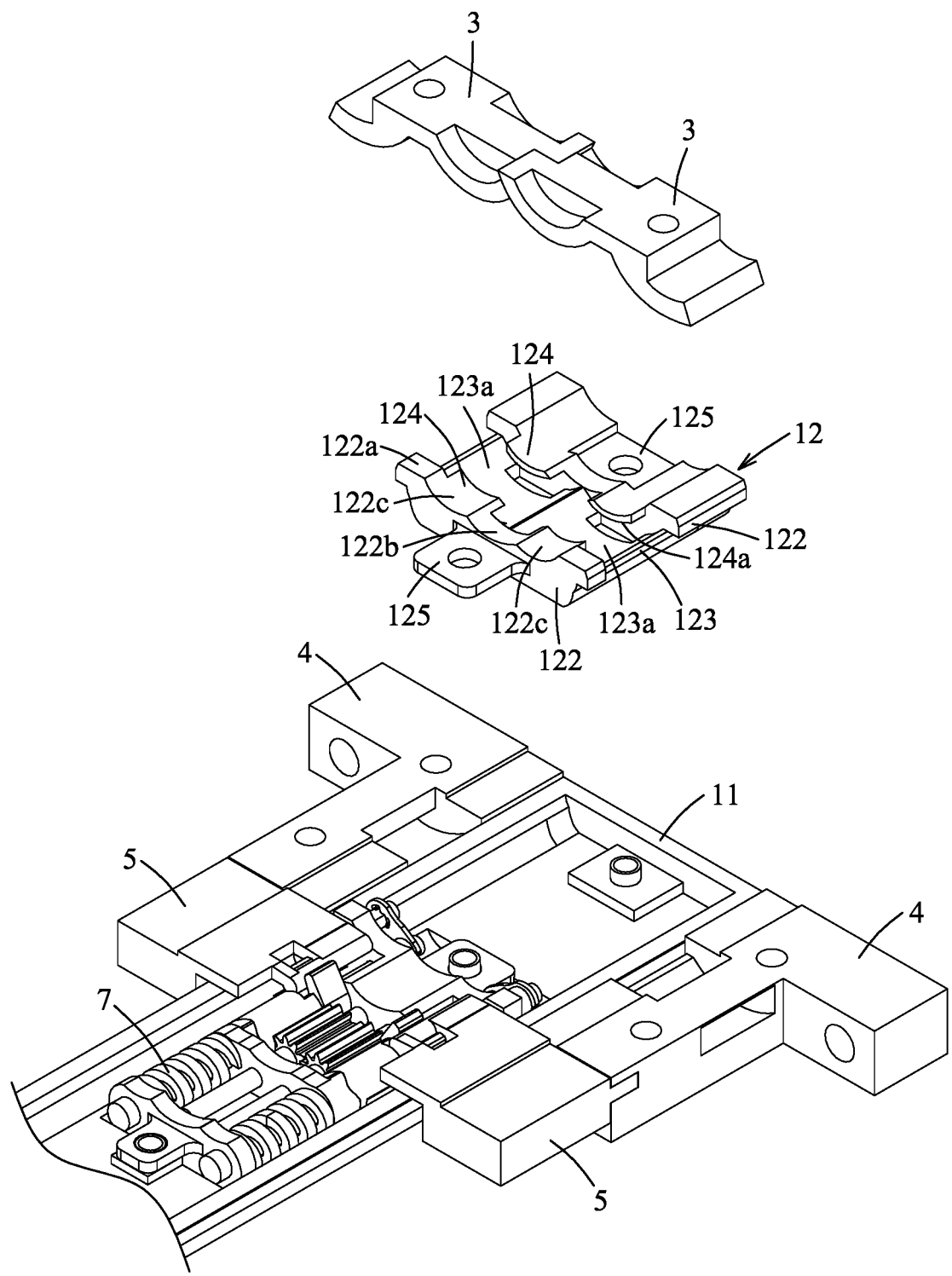
FIG. 6 is a fragmentary exploded perspective view of the embodiment, taken from another angle.

With reference to FIGS. 3, 5 and 6, the rail bracket 12 has two lateral slot walls 122 which extend in a first transverse direction that is transverse to the lengthwise direction and are spaced apart from each other in the lengthwise direction, a bottom slot wall 123 which interconnects the lateral slot walls 122, two pairs of top slot walls 124 which are opposite to each other in the first transverse direction, and two fixed portions 125 which are respectively connected with and extend from the lateral slot walls 122 in the lengthwise direction and fixed on the elongated seat body 11. The top slot walls 124 of each pair respectively extend from the lateral slot walls 122 toward each other, and are spaced apart from the bottom slot wall 123 in a second transverse direction that is transverse to both the lengthwise direction and the first transverse direction. The bottom slot wall 123 has two upwardly facing arcuate surfaces (123a) which are symmetric to each other about the central line (C). The top slot walls 124 of each pair respectively have downwardly facing arcuate surfaces (124a) which face a respective one of the upwardly facing arcuate surfaces (123a). The downwardly facing arcuate surfaces (124a) of each pair cooperate with the upwardly facing arcuate surface (123a) and the lateral slot walls 122 to define one of the first arcuate slots 121. Each of the lateral slot walls 122 has an upper surface (122a), a central arcuate portion (122b) which is recessed from the upper surface (122a) and formed at the central line (C), and two side arcuate portions (122c) which are formed at two opposite sides of the central arcuate portion (122b) in the first transverse direction. The side arcuate portions (122c) are integrally formed with and extend to the corresponding top slot walls 124. The central arcuate portions (122b) cooperatively define the central recessed portion 14. The side arcuate portions (122c) at one side of the central line (C) cooperatively define one of the lateral recessed portions 15. Specifically, the central recessed portion 14 is at the central region defined by the central arcuate portions (122b) and extending along the central line (C). The other component parts of the mounting seat 1 at this region are not beyond the central arcuate portions (122b). Similarly, the lateral recessed portions 15 are at the lateral regions defined by the side arcuate portions (122c) and extending in the lengthwise direction. The other component parts of the mounting seat 1 at these regions are not beyond the side arcuate portions (122c).

Figure 7:
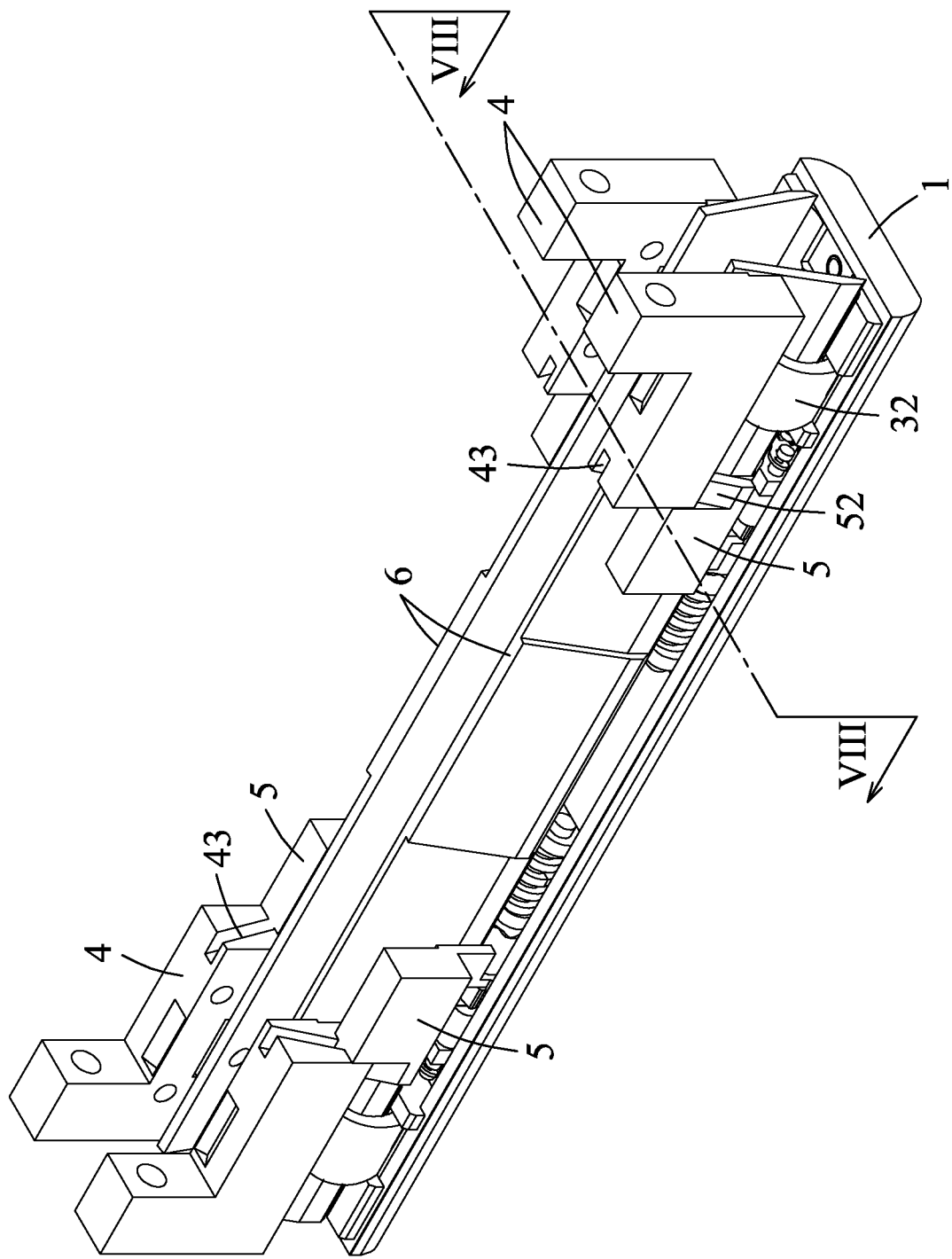
FIG. 7 is a perspective view of the embodiment in a folded state.

Referring again to FIGS. 1 to 4, the two rotary units 2 are connected with the mounting seat 1 and at the two opposite sides of the central line (C), respectively, and are symmetric to each other about the central line (C). The rotary units 2 are shiftable between an unfolded state (as shown in FIG. 1) and a folded state (as shown in FIG. 7). Each of the rotary units 2 includes a linking member 3, a rail sliding block 4, a rotating bracket 5 and a cover plate 6.

The linking member 3 has a linking body 31 which has a cover supporting surface 311, a first arcuate rail 32 which extends from the linking body 31 and which is slidably engaged with a respective one of the first arcuate slots 121, and a second arcuate rail 33 which extends from the linking body 31 and away from the first arcuate rail 32.

Figure 4:
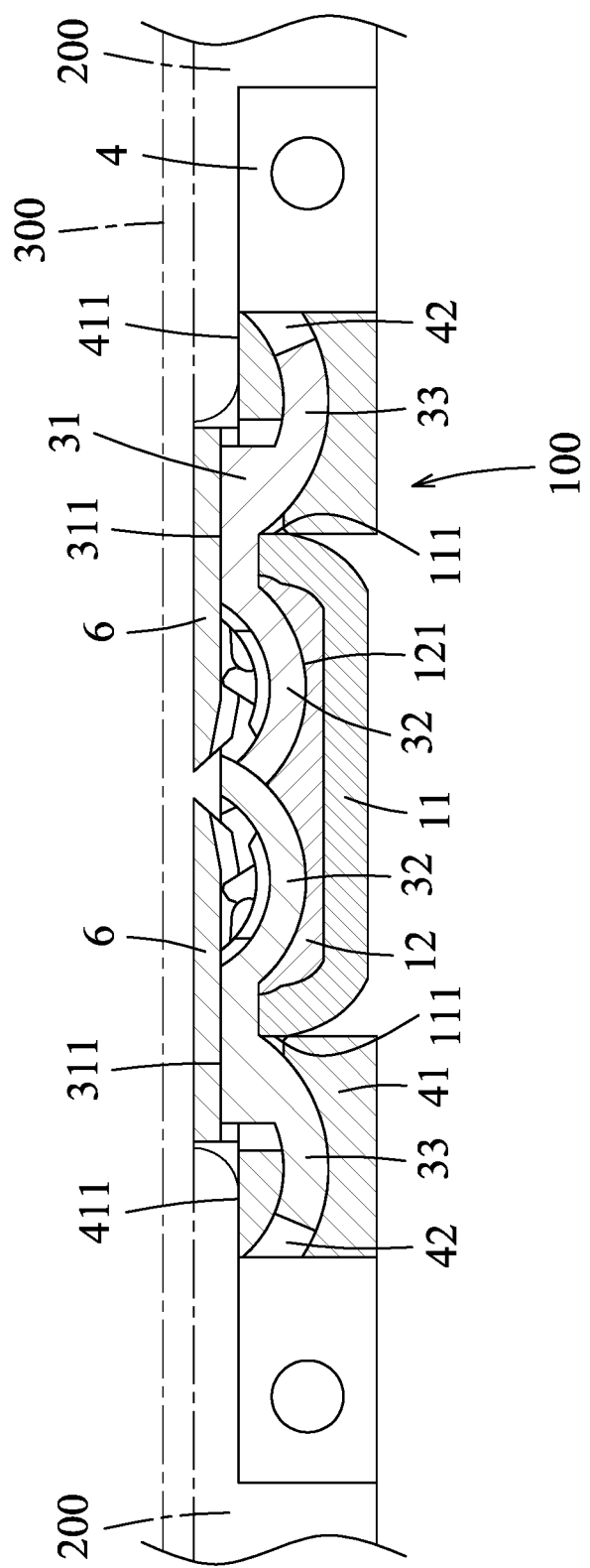
FIG. 4 is a sectional view taken along line IV-IV of FIG. 1.

The rail sliding block 4 has a block body 41 which has a housing supporting surface 411 for one of the housing parts 200 to be attached thereto, and a lateral end surface 412 that is connected with and transverse to the housing supporting surface 411, a second arcuate slot 42 which is formed in the block body 41 and which is slidably engaged with the second arcuate rail 33, and an inclined sliding portion 43 which is formed in the lateral end surface 412 and opposite to the second arcuate slot 42 in the lengthwise direction. In the unfolded state of the rotary units 2, as shown in FIG. 4, the block body 41 is disposed adjacent to the respective lengthwise edge 111 of the mounting seat 1, and the housing supporting surface 411 is disposed parallel to the cover supporting surface 311. In this embodiment, the inclined sliding portion 43 is in the form of a slot which is formed in and recessed from the lateral end surface 412, and is inclined relative to the housing supporting surface 411.

The rotating bracket 5 is pivotally connected with the mounting seat 1, and has a bracket body 51, an inclined guiding portion 52 which extends from the bracket body 51 and is slidably engaged with the inclined sliding portion 43, and a pivot axle portion 53 which extends from the bracket body 51 in the lengthwise direction and is journalled to the fixed bracket 13 to permit rotation of the rotating bracket 5 about the pivot axle portion 53. In this embodiment, the inclined guiding portion 52 is in the form of a protrusion which projects from the bracket body 51.

The cover plate 6 is securely connected with and supported on the cover supporting surface 311 to be moved with the linking member 3.

Figure 8:
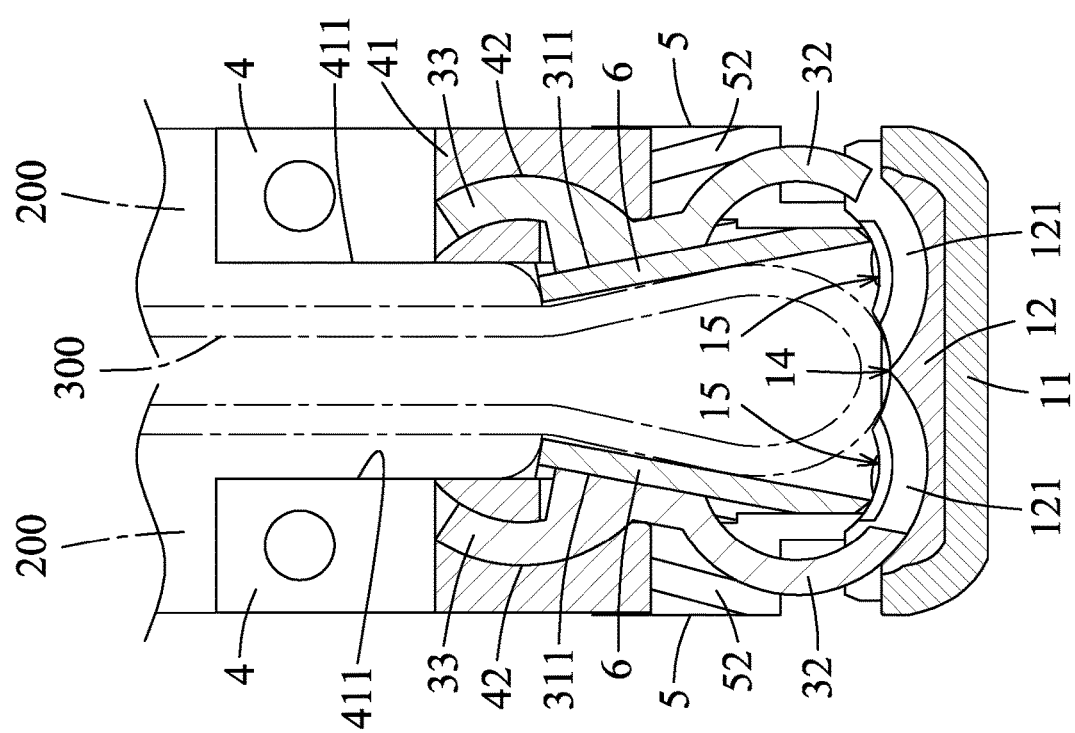
FIG. 8 is a sectional view taken along line VIII-VIII of FIG. 7.

Referring to FIGS. 1 and 4, in the unfolded state of the rotary units 2, the cover supporting surfaces 311 of the linking members 3 are flush with each other and in a horizontal state and the cover plates 6 are disposed to cover the mounting seat 1. Referring to FIGS. 7 and 8, in the folded state of the rotary units 2, the cover supporting surfaces 311 are inclined to each other in a direction away from the mounting seat 1 to bring the cover plates 6 into inclination to each other, and the housing supporting surfaces 411 of the rail sliding blocks 4 are disposed to face and parallel to each other and in a vertical state. Specifically, the cover plates 6 are moved with the linking members 3, and the plate surfaces of the cover plates 6 are disposed parallel to the cover supporting surfaces 311 of the linking members 3. During the shifting of the rotary units 2 from the unfolded state to the folded state, the first arcuate rails 32 of the linking members 3 are slid along and relative to the corresponding first arcuate slots 121 such that distal sides of the cover supporting surfaces 311 distal from the mounting seat 1 are closer to each other than proximal sides of the cover supporting surfaces 311 proximate to the mounting seat 1 in the folded state of the rotary units 2. That is, the cover supporting surfaces 311 extend to and converge to each other and the distance between the cover supporting surfaces 311 is gradually decreased from the proximal sides to the distal sides, and the distance between the cover plates 6 is also decreased in the same manner. Hence, a teardrop shaped space is provided between the cover plates 6 for receiving the bending portion of the flexible display 300. Additionally, the bottom of the bending portion of the flexible display 300 can be matingly disposed on the central recessed portion 14 to increase the receiving space for the flexible display 300. With the lateral recessed portions 15 providing leeway spaces, the cover plates 15 are turnable with the linking members 3 without hindering by the mounting seat 1. During the shifting of the rotary units 2 from the unfolded state to the folded state, the rail sliding block 4 is slid relative to both the second arcuate rail 33 and the inclined guiding portion 52, and is turned relative to the mounting seat 1. With such arcuate sliding and inclined sliding of the rail sliding block 4, in the folded state of the rotary units 2, the housing supporting surfaces 411 face and are parallel to each other such that the housing parts 200 are parallel to and superimposed upon each other.

The cover plates 6 cooperatively cover the mounting seat 1 in the unfolded state such that a support plate disposed for supporting the bending portion of the flexible display 300 is not required, which reduces the number, tolerances and weight of the component parts of the hinge and renders the hinge thinner. Moreover, a teardrop shaped space is provided between the cover plates 6 for receiving the bending portion of the flexible display 300 in the folded state. The bottom of the bending portion of the flexible display 300 can be matingly disposed on the central recessed portion 14 to increase the receiving space for the flexible display 300.

Figure 2:
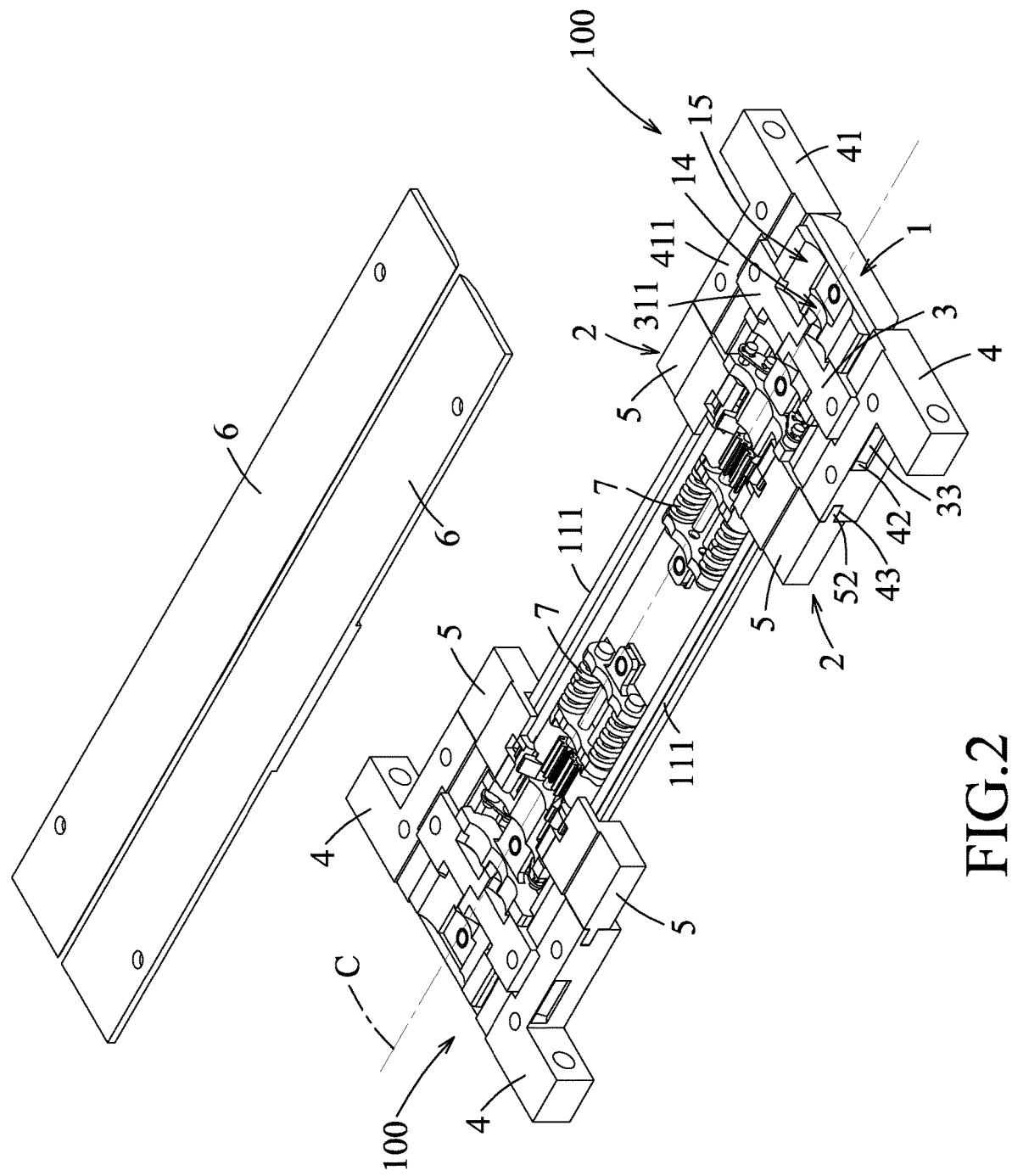
FIG. 2 is an exploded perspective view of the embodiment.

With reference to FIGS. 2 and 3, in this embodiment, the torque synchronous mechanism 7 is disposed on the elongated seat body 11 and is connected to the rotating brackets 5 so as to make synchronous turning of the rotary units 2 in opposite rotational directions and provide a frictional torque to retain the rotary units 2 in a desired angular position.

As illustrated, the hinge 100 according to the disclosure has a fewer number of component parts to reduce the forming tolerances, weight and costs thereof. An increased space is provided for receiving the bending portion of the flexible display 300 in the folded state.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A hinge connectable with two housing parts of a flexible electronic device to allow opening and closing of the housing parts and for supporting a flexible display, comprising:
    a mounting seat extending in a lengthwise direction and having two lengthwise edges at two opposite sides of a central line, said mounting seat having two first arcuate slots which are symmetric to each other and extend from the central line toward said lengthwise edges, respectively, and a central recessed portion which is formed at the central line; and
    two rotary units connected with said mounting seat and at said two opposite sides of the central line, respectively, and symmetric to each other, said two rotary units being shiftable between an unfolded state and a folded state, each of said rotary units including
        a linking member having a linking body which has a cover supporting surface, a first arcuate rail which extends from said linking body and which is slidably engaged with a respective one of said first arcuate slots, and a second arcuate rail which extends from said linking body and away from said first arcuate rail,
        a rail sliding block having a block body which has a housing supporting surface for one of the housing parts to be attached thereto, and a lateral end surface that is connected with and transverse to said housing supporting surface, a second arcuate slot which is formed in said block body and slidably engaged with said second arcuate rail, and an inclined sliding portion which is formed in said lateral end surface and opposite to said second arcuate slot in the lengthwise direction, wherein, in the unfolded state of said rotary units, said block body is disposed adjacent to a respective one of said lengthwise edges of said mounting seat, and said housing supporting surface is disposed parallel to said cover supporting surface,
        a rotating bracket pivotally connected with said mounting seat, and having a bracket body and an inclined guiding portion which extends from said bracket body and is slidably engaged with said inclined sliding portion such that, during the shifting of said rotary units from the unfolded state to the folded state, said rail sliding block is slid relative to both said second arcuate rail and said inclined guiding portion and is turned relative to said mounting seat, and
        a cover plate securely connected with and supported on said cover supporting surface to be moved with said linking member;
    wherein, in the unfolded state of said rotary units, said cover supporting surfaces of said linking members are flush with each other and in a horizontal state and said cover plates are disposed to cover said mounting seat, and wherein, in the folded state of said rotary units, said cover supporting surfaces are inclined to each other in a direction away from said mounting seat to bring said cover plates into inclination to each other, and said housing supporting surfaces of said rail sliding blocks are disposed to face and parallel to each other and in a vertical state.

2. The hinge as claimed in claim 1, wherein said inclined sliding portion is in form of a slot which is formed in and recessed from said lateral end surface, said inclined guiding portion being in form of a protrusion which projects from said bracket body.

3. The hinge as claimed in claim 1, wherein said mounting seat further has two lateral recessed portions formed at two opposite sides of said central recessed portion, respectively, to provide leeway spaces for turning of said cover plates of said rotating units, respectively.

4. The hinge as claimed in claim 1, wherein said mounting seat includes an elongated seat body and a rail bracket which is securely mounted on said elongated seat body and is formed with said first arcuate slots therein.

5. The hinge as claimed in claim 4, wherein said rail bracket has two lateral slot walls which extend in a first transverse direction that is transverse to the lengthwise direction and are spaced apart from each other in the lengthwise direction, a bottom slot wall which interconnects said lateral slot walls, and two pairs of top slot walls which are opposite to each other in the first transverse direction, said top slot walls of each pair respectively extending from said lateral slot walls toward each other, and being spaced apart from said bottom slot wall in a second transverse direction that is transverse to both the lengthwise direction and the first transverse direction, said bottom slot wall having two upwardly facing arcuate surfaces which are symmetric to each other about the central line, said top slot walls of each pair respectively having downwardly facing arcuate surfaces which face a respective one of said upwardly facing arcuate surfaces, said downwardly facing arcuate surfaces of each pair cooperating with said upwardly facing arcuate surface and said lateral slot walls to define one of said first arcuate slots.

6. The hinge as claimed in claim 5, wherein each of said lateral slot walls has an upper surface, a central arcuate portion which is recessed from said upper surface and formed at the central line, and two side arcuate portions which are formed at two opposite sides of said central arcuate portion in the first transverse direction, said side arcuate portions being integrally formed with and extending to corresponding ones of said top slot walls, said central arcuate portions cooperatively defining said central recessed portion, said side arcuate portions at one side of the central line cooperatively defining a lateral recessed portion to provide a leeway space for turning of said cover plate of a respective one of said rotating units.

7. The hinge as claimed in claim 5, wherein said rail bracket further has two fixed portions which are respectively connected with and extend from said lateral slot walls in the lengthwise direction and fixed on said elongated seat body.

\* \* \* \* \*